Patented Jan. 26, 1937

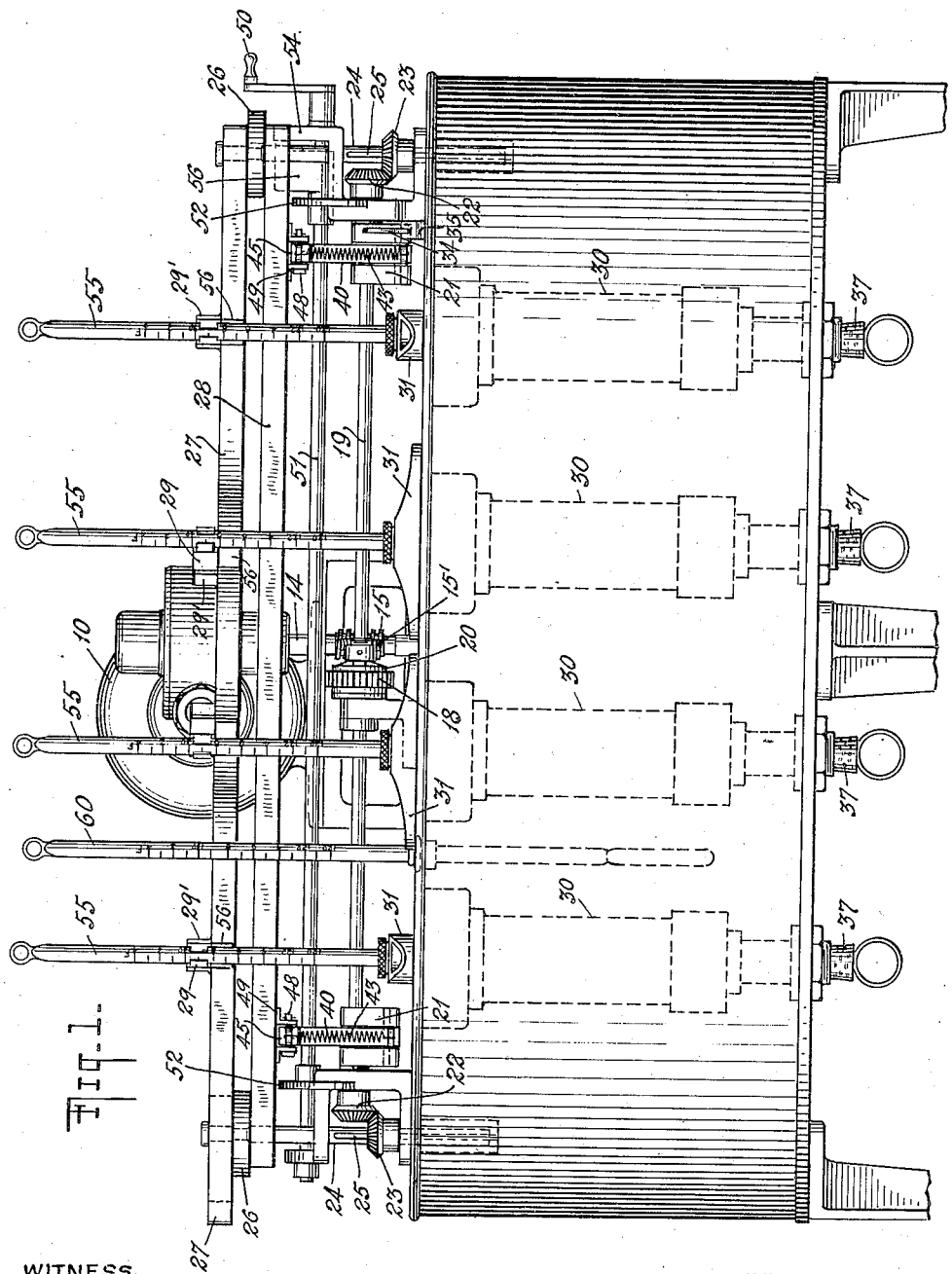

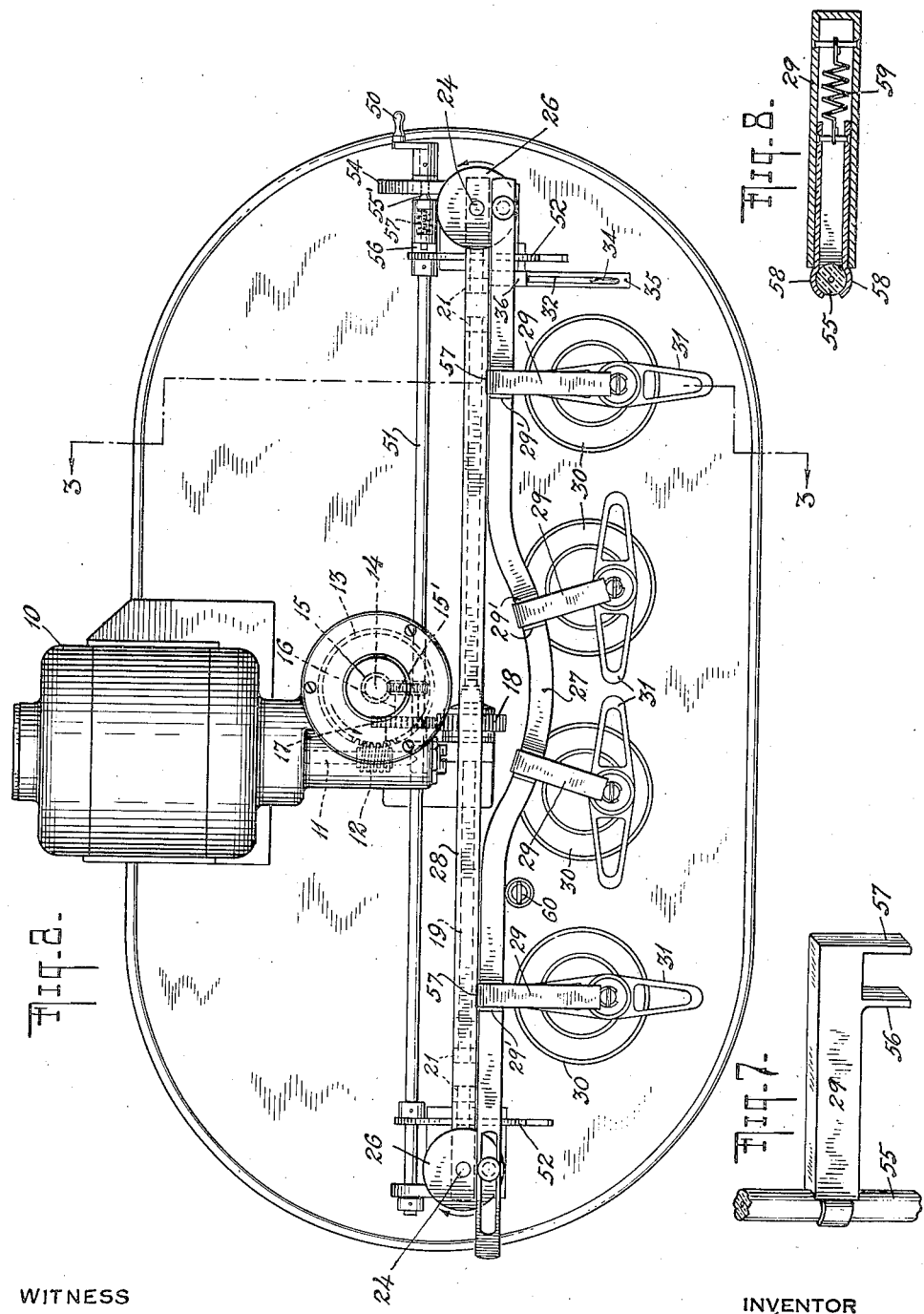

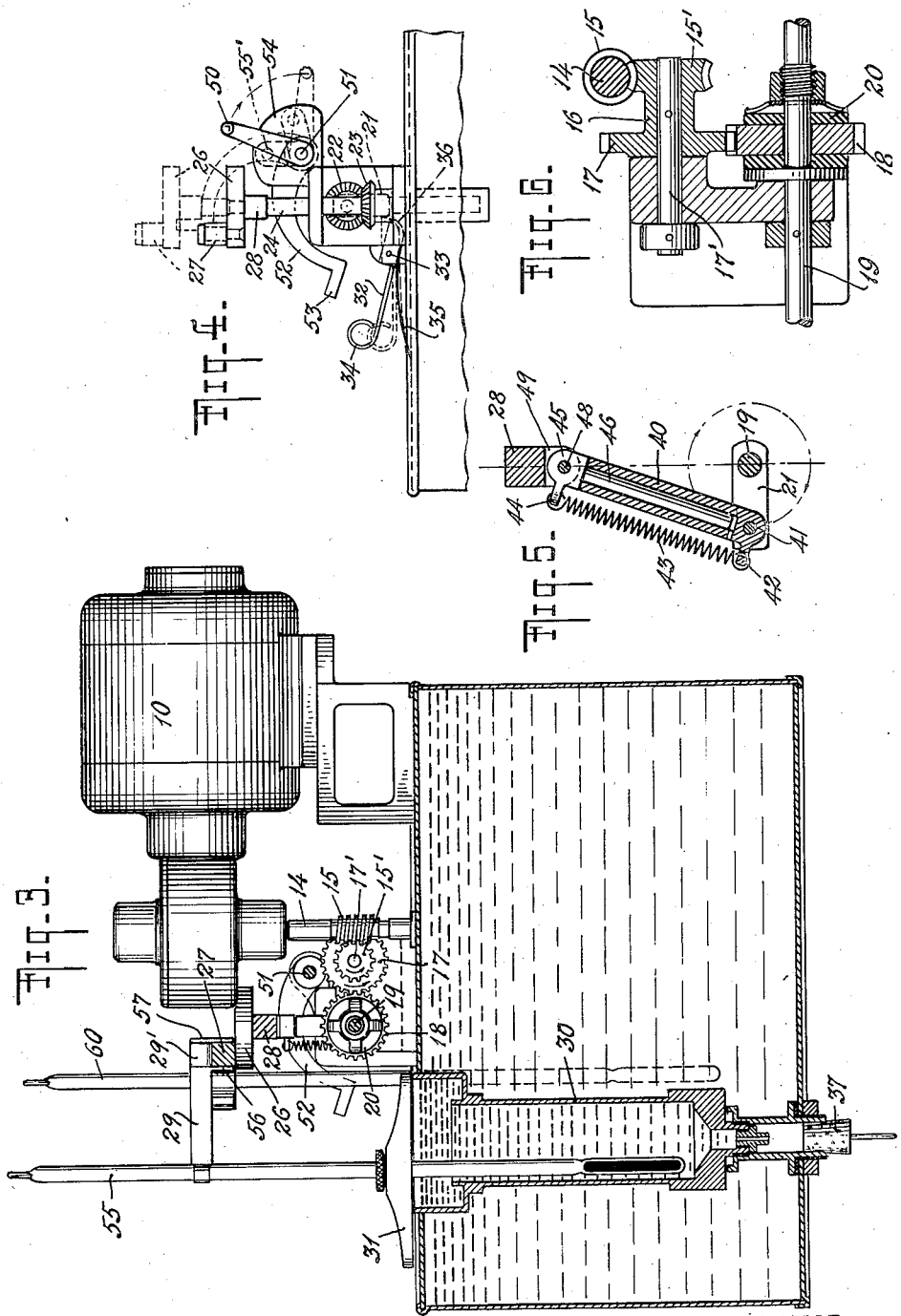

2,068,976

UNITED STATES PATENT OFFICE 2,068,976

VISCOSIMETER

John H. Dillon, Bellerose, N. Y., assignor to Charles J. Tagliabue Mfg. Co., Brooklyn, N. Y., a corporation of New York Application February 21, 1936, Serial No. 65,000

9 Claims. (Cl. 265—11)

The invention relates to a viscosimeter for carrying out the Saybolt method of determining the viscosities of oils or other liquid substances, and more particularly to a device for mechanically stirring such substances by means of thermometers extending into the tubes of the viscosimeter containing the substances to be tested.

A primary object of the invention is to provide an apparatus for stirring the oil or other liquid material, the viscosity of which is to be determined, the device being effective to stir automatically the material so as to insure uniformity of temperature throughout the body of liquid and thereby make possible more accurate determinations of the viscosity of the material. A further object of the invention is to provide a stirring mechanism which is effective in appreciably reducing the time required for the tests.

The Saybolt method for determining the viscosities of oils and similar substances is a recognized standard method, the directions for which are contained in published Method D88–33 of the American Society for Testing Materials. Such standard method directs that the oil in the tubes be stirred by a thermometer of specified dimensions for at least one minute. While such standard method does not specify the exact stirring motion to be maintained, the best results are secured when the stirring motion is one involving vertical reciprocatory motion of the thermometer combined with a circular motion of such thermometer within the oil tube.

The apparatus of the present invention comprises a support for the plurality of thermometers partly immersed in the oil, to which support is imparted a definite bodily motion effective to move the thermometers in a vertical direction within the tube, i. e. up and down therein, and at the same time move them in a circle, so that every point in and on said thermometers moves in a path defining a helix. The motion imparted to the support is such that any particular point in the support is always describing a circle.

In accordance with my invention, I make provision for having the support from which the thermometers depend into the oil tubes, impart to the thermometers only the circular motion without the vertical reciprocating motion. Thus, by means of the construction of my novel apparatus, it is possible to effect the circular movement of the thermometers within the oil tubes without bringing about their vertical reciprocatory movement, a condition which may become necessary in the course of use of the viscosimeter.

In the accompanying drawings, in which is illustrated a particular embodiment of my invention, Fig. 1 is a face view of a thermostatic viscosimeter to which my novel stirring mechanism has been applied; Fig. 2 is a plan view thereof; Fig. 3 is a section on the line 3—3 of Fig. 2; Fig. 4 is a detail end view of the mechanism by means of which the vertical reciprocatory motion of the support is interrupted; Fig. 5 is an enlarged sectional detail of the crank arm and associated spring designed to permit the elimination of the vertical reciprocatory motion of the thermometers within the oil tubes; Fig. 6 is an enlarged detailed sectional view of the clutch mechanism controlling the main shaft; Fig. 7 is an enlarged detail of one of the clamping members supporting a thermometer; and Fig. 8 is a horizontal section through one of the clamping members and thermometer supported thereby.

Referring more particularly to the drawings, in which similar reference characters identify similar parts in the several views, the motor 10 has the end of its shaft 11 provided with a worm gear 12 meshing with a large gear 13 secured to shaft 14. The motor 10 and the entire stirring mechanism is mounted upon the viscosimeter structure. Near the lower end of such shaft is the worm gear 15 meshing with a worm wheel 15' integral with a hub 16, the other end of the hub being formed into a pinion gear 17 mounted upon a counter-shaft 17'. The gear 17 meshes with a gear 18 centrally mounted upon an elongated crank shaft 19. The clutch mechanism 20, hereinafter more fully described, frictionally controls the rotation of the crank shaft 19. Rotation of the gear 18 produces rotation of the friction clutch 20, of the drive shaft 19, and of the cranks 21, 21 mounted near the ends of the drive shaft 19. Secured to the ends of the drive shaft 19 are bevel gears 22 meshing with bevel gears 23 secured to the vertical lifting shafts 24. The vertical lifting shafts are keyed or slotted at 25 permitting a free vertical reciprocatory motion of such shafts through the bevel gears 23 without affecting the rotary motion of such gears. Near the upper ends of the vertical lifting shafts 24 are secured circulating discs 26 above which are secured the ends of a circulating bar 27 and below which are secured the ends of a lifting bar 28.

The motion of the crank 21, as produced by the rotation of the drive shaft 19, causes the circulating bar 27 and the lifting bar 28 to be raised and lowered with each revolution of the drive shaft.

Secured to the circulating bar 27 are a plurality of clamping members 29, one for each thermometer, to be clamped thereby and depend therefrom so as to extend into each of the oil tubes 30, four of such oil tubes being shown in dotted lines in the viscosimeter illustrated. Pairs of lugs 29' are secured to the circulating bar 27, such lugs positioning the clamping members 29 thereon and preventing lateral displacement thereof upon the bar. The configuration of the circulating bar 27 is such, as shown in the plan view, Fig. 2, that the clamping members 29 support the thermometers in position directly above the oil tubes 30, the thermometers passing through cross bars 31 straddling the top surfaces of the oil tubes.

The circular motion of the discs 26 produces in the circulating bar 27 a motion such that every point in the circulating bar during its entire motion describes a circle. Therefore, each of the thermometers held by the clamping members 29, attached to the circulating bar, will have a motion within the oil tube describing a circle. Thus, the combination of the vertical movement of the thermometers is produced by the up and down movement of the lifting shafts 24 and the horizontal circular motion of the circulating bar 27 and of the lifting bar 28 produces a combination vertical reciprocatory and circular motion at a predetermined number of revolutions per minute. For best results, the circular motion should be approximately 120 R. P. M.

In order to permit the operator to stop the motion of the stirring mechanism to enable him to read the thermometers, such reading being necessary from time to time in order to determine the exact temperature of the oil in the tubes, I provide a brake device illustrated in detail in Fig. 4. Such brake device is effective to engage one of the cranks 21 and comprises a lever 32 pivoted at 33, the lever being adapted to be pressed downwardly by means of the finger grip 34 against a leaf spring 35, so as to have the nose 36 of the pivoted lever raised into the path of the crank 21 and thereby prevent its rotation. The engagement of the crank by the brake causes a holding of the shaft 19 by the stationary crank and the slippage of the friction clutch 20. It is to be noted that the operation of the motor is not interfered with, the gear 18 continuing its rotation.

The above described device for stopping both the vertical and circular motion, effected through slippage of the friction clutch 20, permits frequent inspection of the thermometers by the operator so that he can determine when the oil in the tubes has reached a constant temperature. When such constant temperature has been reached, it must be maintained, in accordance with the prescribed method, for one minute, after which period a determination of the viscosity of the oil can be made by removing the cork 37 from the bottom of the oil tube.

It is desirable toward the end of the test period to discontinue the vertical reciprocatory movement of the stirring mechanism and to finish off the test with only a circular movement of the thermometers within the oil tubes. In order to accomplish this elimination of the up and down movement of the stirring mechanism while maintaining the circulatory movement thereof, the arms of the crank 21 are made up of sliding sections (Fig. 5). One of such sections 40, pivoted at 41 to the crank 21, has an extension 42 to which is anchored one end of a spring 43, the other end of the spring being anchored in projection 44 of the head 45 of the second sliding member 46, which latter constitutes a plunger adapted to ride within the hollow section 40 of the crank arm. While the weight of the lifting bar and associated parts may be sufficient to cause the return of the plunger by gravity, to its lower position, I provide the spring 43 to insure positive operation of the device.

The head 45 of the sliding section 46 is secured by means of bolt 48 within the brackets 49 attached to the lifting bar 28. When it is desired to discontinue the up and down movement of the lifting bar, the handle 50 at the end of shaft 51 is turned in the direction of the arrow in Fig. 4. Secured to the shaft 51 are cams 52 having projections 53 at the ends thereof. As will be clear from an examination of Fig. 4, when the handle 50 is brought from the position thereof indicated in full lines to the position thereof indicated in dotted lines, i. e., in the direction of the arrow, the shaft 51 will be rotated and the cams 52 will be rotated with the shaft, causing the surfaces of the cam to abut against the lower surface of the lifting bar 28, causing the same to be raised to the upper extent of its possible lifting motion. The cams 52 have projections 53 at their extremities to limit the throw of the cam. For securing the handle 50 in either one of the positions thereof illustrated in Fig. 4, the segment 54 is provided with two indentations in which the tapered end of a plunger 55' is adapted to be seated. The plunger is housed within a hub 56, spring 57 within the hub being provided for urging the plunger toward the segment 54.

The clamping members 29 holding the thermometers 55 are constructed with depending projections 56, 57 which straddle the circulating bar 27. The structure of the clamping member is shown in section in Fig. 8 from which it will be seen that such clamping member is constituted of a pair of spring jaws 58 adapted to hold a thermometer 55 in position. The spring jaws are anchored within the clamping member 29 by means of a spring 59. In order to release or remove a thermometer from within the clamping jaws 58, the entire clamping member, with its thermometer, may be lifted from the circulating bar and the thermometer removed from the clamp by pulling it lengthwise from between the clamping jaws.

The combination vertically reciprocating motion and circulatory motion effected by my novel stirring apparatus is operative with respect to the plurality of thermometers positioned within the oil tubes. A thermometer 60 is conveniently provided with the viscosimeter structure for determining the temperature of the bath surrounding the tubes.

The bath casing and supporting structure of the viscosimeter to which my novel stirring mechanism is applied may be of usual construction and forms no part of the present invention and will therefore not be described in detail.

While I have described a particular embodiment of my invention, it is obvious that various changes, particularly in the arrangement and configuration of the several parts, may be made without departing from my invention.

I claim:

1. Mechanism for effecting automatically the stirring of the material in the tubes of a viscosimeter having a bath casing for a heating medium, a plurality of oil tubes disposed therein, and an outlet orifice for each of said tubes, while, at the same time, permitting measurement of the temperature of such material comprising a plurality of substantially vertically disposed thermometers constituting the stirring media, one for each of the tubes of the viscosimeter, a support for said thermometers including a circular motion bar and a lifting bar, and means for imparting to said bars a simultaneous circular and vertically reciprocating bodily motion, whereby every point in and on said thermometers moves in a path defining a helix.

2. A viscosimeter comprising a bath casing for a heating medium, a tube in said bath adapted to contain the viscous material to be examined, an outlet orifice for the material in the tube permitting the flow thereof out of said tube after a predetermined temperature has been acquired, a support provided with means for temporarily securing a thermometer thereto in registry with the tube, means for imparting to said thermometer associated with said support a bodily motion including a circular motion and vertically reciprocating motion, whereby every point in said thermometer moves in a path defining a helix, and means capable of actuation to disable, temporarily when desired, the vertical component only of the bodily motion.

3. Apparatus as claimed in claim 1 including a shaft, a pair of cranks secured to each end of the shaft, a pair of arms having sliding sections and secured at their lower ends to said cranks and at their upper ends to the lifting bar, a yieldable element within said arms, and a brake effective to abut against one of said cranks thereby interrupting the rotary motion of said shaft.

4. Apparatus for automatically stirring the material in the tubes of a thermostatic viscosimeter having a bath casing for a heating medium, a plurality of oil tubes disposed therein, and an outlet orifice for each of said tubes, while, at the same time, permitting measurement of the temperature of such material by means of thermometers extending into the liquid in such tubes, which comprises a support for said thermometers, said support constituting a pair of bars extending across and above the viscosimeter tubes, means for imparting to one of said bars a motion such that every point therein, throughout its movement, describes a circle, and to the other of said bars a vertically reciprocating motion, said means comprising a pair of shafts each having a keyway disposed longitudinally thereof, and a pair of discs secured to the upper ends of said shafts and having secured thereto, the ends of said circulating bar.

5. Apparatus as claimed in claim 1, including means to discontinue the reciprocatory vertical movement of said thermometers, comprising a pair of crank arms having sliding sections one inside the other, a shaft, a pair of cams secured to the ends thereof adapted to be rotated so as to arrest the lifting bar at the upper extremity of its reciprocatory movement, said crank arms being secured at their lower ends to said cams and at their upper ends to the lifting bar, and a yieldable element in each of said crank arms.

6. Apparatus for stirring the material in the tubes of a thermostatic viscosimeter comprising an electric motor, a drive shaft, a crank mounted on said shaft, a pair of gears mounted at the ends of said shaft, a pair of gears meshing with said first mentioned gears, a pair of vertical lifting shafts having vertical slots therein, a pair of discs secured to the upper ends of said lifting shafts, a circulating bar secured at one end to one of said discs and supported at its other end upon the second of said discs, a lifting bar having its ends secured to said vertical shafts, a plurality of thermometer clamping members mounted upon the circulating bar, and a plurality of thermometers supported by said clamping members and adapted to depend therefrom into the viscosimeter tubes.

7. Apparatus as claimed in claim 6 including a brake mechanism adapted to engage the crank upon the drive shaft and thereby arrest the movement of said circulating and lifting bars.

8. Apparatus as claimed in claim 6 including means for arresting the movement of the lifting bar, said means comprising a pair of sliding sections constituting the crank for the vertically reciprocable bar and having a yieldable element, adapted to slide one inside the other, a shaft, and a cam secured at one end thereof adapted to be rotated so as to hold the lifting bar at the upper extremity of its reciprocatory movement.

9. Mechanism for effecting automatically the stirring of the material to be tested by a viscosimeter having a bath casing for a heating medium, a tube disposed therein for containing the material to be tested, and an outlet orifice in said tube, while at the same time permitting measurement of the temperature of such material, comprising a substantially vertically disposed thermometer constituting the stirring means extending into the tube of the viscosimeter, a support for said thermometer including a circular motion bar and a lifting bar, and means for respectively imparting to said bars a simultaneous circular and vertically reciprocating bodily motion whereby every point in and on said thermometer moves in a path defining a helix.

JOHN H. DILLON.